US012699538B1

(12) United States Patent
Wu et al.

(10) Patent No.: US 12,699,538 B1
(45) Date of Patent: Aug. 4, 2026

(54) SYSTEM AND METHOD FOR CASTING CONTENT

(71) Applicant: GOOGLE LLC, Mountain View, CA (US)

(72) Inventors: Shengzhi Wu, Shenzhen (CN); Alexander James Faaborg, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 167 days.

(21) Appl. No.: 18/618,710

(22) Filed: Mar. 27, 2024

Related U.S. Application Data

(63) Continuation of application No. 17/595,172, filed as application No. PCT/US2020/070793 on Nov. 16, 2020, now Pat. No. 11,947,859.

(51) Int. Cl.
| | |
|---|---|
| *G06F 3/14* | (2006.01) |
| *G06F 3/0484* | (2022.01) |
(Continued)

(52) U.S. Cl.
CPC .......... *G06F 3/1454* (2013.01); *G06F 3/0484* (2013.01); *G06T 7/74* (2017.01);
(Continued)

(58) Field of Classification Search
CPC .......... G06F 3/1454; G06F 3/01; G06F 3/048; G06F 3/00; G06F 3/0484; G06F 3/011;
(Continued)

(56) References Cited

U.S. PATENT DOCUMENTS

| | | |
|---|---|---|
| 6,734,859 B2 | 5/2004 | Hayashi et al. |
| 9,613,448 B1 | 4/2017 | Margolin |
(Continued)

FOREIGN PATENT DOCUMENTS

| | | |
|---|---|---|
| CN | 1334507 A | 2/2002 |
| CN | 104049592 A | 9/2014 |
(Continued)

OTHER PUBLICATIONS

U.S. Appl. No. 17/595,172, filed Nov. 10, 2021, Allowed.
(Continued)

*Primary Examiner* — Pegeman Karimi
(74) *Attorney, Agent, or Firm* — Brake Hughes Bellermann LLP

(57) ABSTRACT

A system and method provides for the transfer of the output of content from a user device to an external device for output by the external device. External devices may be detected in a physical space, and identified based on previous connection with the user device, based on a shared network or shared system of connected devices including the user device, based on image information captured by the user device and previously stored anchoring information that identifies the external devices, and the like. An external device may be selected for potential output of the content based on previously stored configuration information associated with the external device including, for example, output capabilities associated with the external device. The identified external device may output the transferred content in response to a user verification input, verifying that the content is to be output by the external device.

19 Claims, 12 Drawing Sheets

(51) Int. Cl.

| | |
|---|---|
| *G06T 7/73* | (2017.01) |
| *G06V 20/20* | (2022.01) |
| *H04W 4/029* | (2018.01) |
| *H04W 76/10* | (2018.01) |

(52) U.S. Cl.
CPC ............ *G06V 20/20* (2022.01); *H04W 4/029* (2018.02); *H04W 76/10* (2018.02)

(58) Field of Classification Search
CPC .... G06T 7/73; G06T 7/70; G06T 7/74; G06V 20/20; H04W 4/029; H04W 76/10; G09G 2370/042; H04N 21/4122; H04N 21/43637; H04N 21/44227; H04N 21/485
See application file for complete search history.

(56) References Cited

U.S. PATENT DOCUMENTS

| | | | |
|---|---|---|---|
| 9,818,225 B2 | 11/2017 | Wang et al. | |
| 10,809,527 B2 | 10/2020 | Song et al. | |
| 2013/0050432 A1* | 2/2013 | Perez ....................... | G06F 3/011 |
| | | | 348/47 |

| | | | |
|---|---|---|---|
| 2015/0317518 A1* | 11/2015 | Fujimaki .............. | G02B 27/017 |
| | | | 345/633 |
| 2017/0178592 A1 | 6/2017 | Dow et al. | |
| 2018/0054487 A1 | 2/2018 | Hebsur et al. | |
| 2019/0250873 A1 | 8/2019 | Blume et al. | |
| 2019/0268460 A1* | 8/2019 | Agrawal .............. | H04W 4/021 |
| 2019/0294405 A1 | 9/2019 | Watson et al. | |
| 2020/0192622 A1* | 6/2020 | Stoyles ................ | G02B 27/017 |
| 2021/0326094 A1* | 10/2021 | Buerli .................. | G06F 3/0488 |

FOREIGN PATENT DOCUMENTS

| | | |
|---|---|---|
| CN | 104317815 A | 1/2015 |
| JP | 2009060512 A | 3/2009 |
| KR | 100970121 B1 | 7/2010 |

OTHER PUBLICATIONS

International Search Report and Written Opinion for PCT Application No. PCT/US2020/070793, mailed on Aug. 10, 2021, 14 pages.
"How to AirPlay Video and Mirror Your Device's Screen", Apple Inc., Dec. 10, 2019, 6 pages.
"Mirroring Assist", MIRRORING360 by Splashtop, 2020, 4 pages.

* cited by examiner

Confirm cast of content from your device to this device

SYSTEM AND METHOD FOR CASTING CONTENT

CROSS REFERENCE TO RELATED APPLICATIONS

This application is a continuation of U.S. application Ser. No. 17/595,172, filed on Nov. 10, 2021, entitled "System and Method for Casting Content," which is a 35 U.S.C. § 371 National Phase Entry Application from PCT/US2020/070793, filed Nov. 16, 2020, designating the U.S., the disclosures of which are incorporated herein by reference in their entireties.

BACKGROUND

Connected, or networked, or compatible devices allow users to consume, share and control content using different devices. Some systems rely on a series of user inputs to scan for and detect compatible devices, initiate sharing and/or mirroring of content, control compatible devices, and the like. This can result in a complicated and cumbersome user experience, and may discourage users from taking advantage of this capability.

SUMMARY

In one general aspect, a computer-implemented method includes executing, by a processor of a user device, content on the user device; detecting, by the user device, at least one external device within a set range of the user device; identifying the at least one external device for output of the content being executed by the user device based on output capabilities of the at least one external device and output characteristics of the content being executed by the user device; and transferring execution of the content from the user device to the at least one external device for output by the at least one external device.

In some implementations, detecting the at least one external device within the set range of the user device includes detecting the at least one external device within a field of view of the user device. In some implementations, identifying the at least one external device includes detecting physical features in image information captured by the user device; identifying a location of the user device based on the detected physical features; and identifying the at least one external device based on the identified location of the user device. In some implementations, the user device includes a handheld device and a head mounted display device, such that executing content includes executing content on the handheld device; and detecting physical features in the image information includes detecting physical features in image information captured within the field of view of the head mounted display device. In some implementations, identifying the location of the user device based on the detected physical features includes identifying the location of the user device based on a comparison of previously stored features in a database and accessible to the user device via a server.

In some implementations, detecting the at least one external device within the set range of the user device includes at least one of detecting the at least one external device as a previously connected device; detecting the at least one external device based on an electromagnetic signal; detecting the at least one external device within a shared network; or detecting the at least one external device within a network of previously connected devices. In some implementations, detecting the at least one external device within the set range of the user device includes detecting the at least one external device within a field of view of a user of the user device.

In some implementations, transferring the execution of the content from the user device to the at least one external device for output by the at least one external device includes outputting a request for user verification prior to transferring the content from the user device to the at least one external device; receiving a user verification input verifying the transfer of content from the user device to the at least one external device; and transferring the execution of the content from the user device to the at least one external device in response to receiving the user verification input. In some implementations, outputting the request for user verification includes outputting at least one of a visual request or an audible request, and receiving the user verification input includes receiving at least one of a touch input or an audible input.

In another general aspect, a system includes an output system including an audio output device and an image output device; a sensing system; at least one processor; and a memory. The memory stores instructions that, when executed by the at least one processor, cause the at least one processor to output, by the output system, content executed by the at least one processor; detect, by the sensing system, at least one external device within a set range of the sensing system; identify the at least one external device for output of the content being executed by the user device based on output capabilities of the at least one external device and output characteristics of the content being output by the output system; and transfer execution of the content to the at least one external device for output by the at least one external device.

In some implementations, in detecting the at least one external device the instructions cause the at least one processor to at least one of detect the at least one external device based on image information captured by the sensing system; detect the at least one external device as a previously connected device; detect the at least one external device based on an electromagnetic signal; detect the at least one external device within a shared network; or detect the at least one external device within a network of previously connected devices. In some implementations, in detecting the at least one external device based on image information captured by the sensing system, the instruction cause the at least one processor to detect physical features in the image information; identify a location based on a comparison the detected physical features and with previously stored features in a database accessible to the system via a server; and identify the at least one external device based on the identified location.

In some implementations, in transferring the execution of the content to the at least one external device, the instructions cause the at least one processor to output a request for user verification prior to transferring the content to the at least one external device; receive a user verification input verifying the transfer of content to the at least one external device; and transfer the execution of the content to the at least one external device in response to receiving the user verification input. In some implementations, the request for user verification includes at least one of a visual request or an audible request, and the user verification input includes at least one of a touch input or an audible input. In some implementations, the output system, the sensing system, the at least one processor and the memory are installed in at least one of a handheld electronic device or a head mounted display device that are operable within a network.

DETAILED DESCRIPTION

Figure 1:
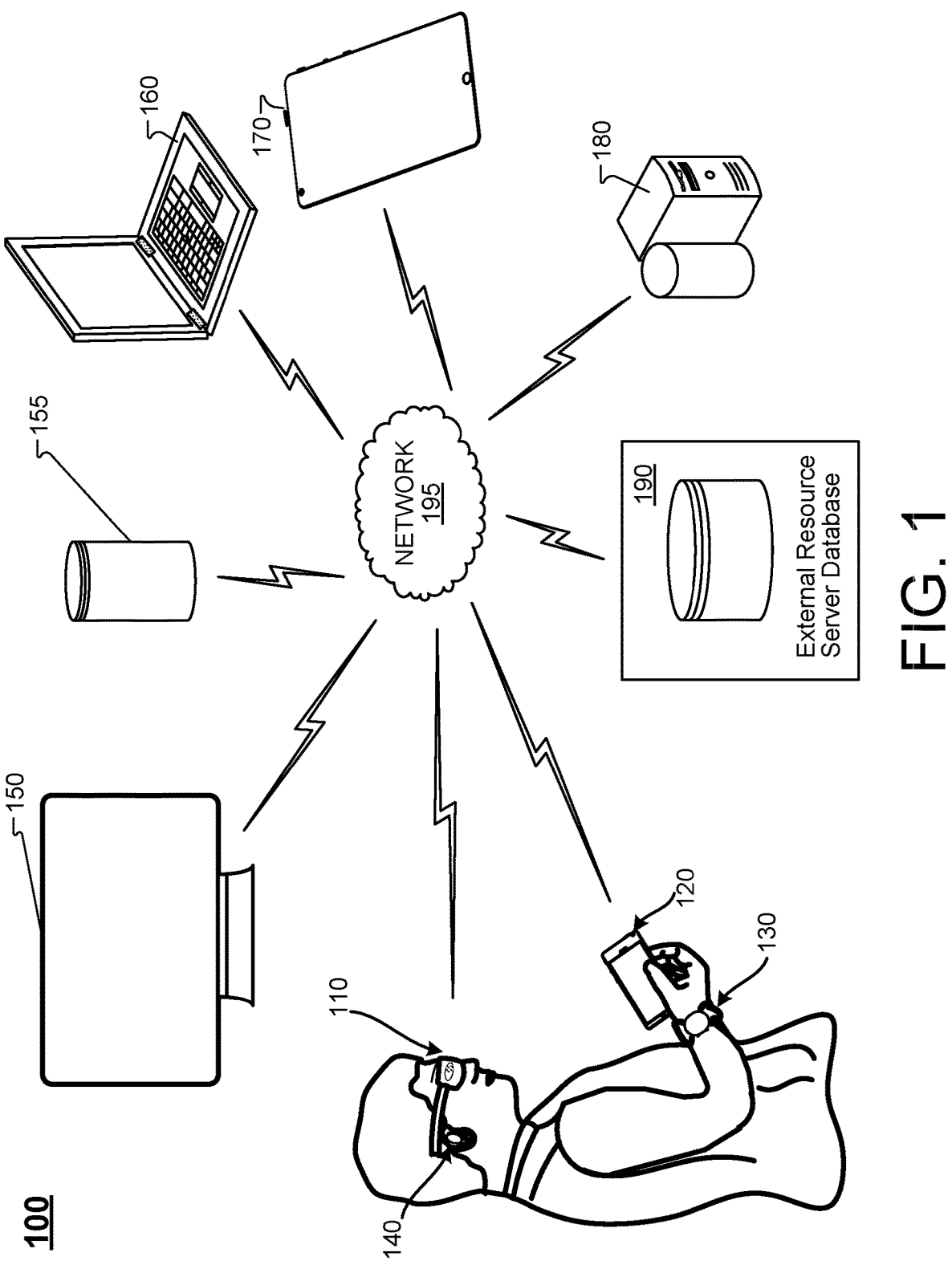
FIG. 1 is a diagram of an example system, in accordance with implementations described herein.

Users may consume content using a number of different types of devices, including, for example, handheld devices (smartphones and the like), wearable devices such as hand and/or wrist worn devices (smart watches, smart bracelets, smart rings and the like), head mounted devices (smart glasses, goggles, headsets and the like), ear worn devices, neck worn lanyard devices, other mobile devices (tablet computing devices, laptop computing devices and the like), desktop computing devices, smart televisions, smart speakers, and other such devices. A system and method, in accordance with implementations described herein, provides for the sharing and transferring of the execution of content, executed and output by a user device, from the user device to a detected external device, for execution and output by the external device, in response to the detection of the external device. For example, the execution of content may be transferred or shared for output by the external device in response to the detection of the external device within a set proximity or a set range of the user device, detection of the external device within a field of view of the user device, detection of the external device based on image data collected by the user device, detection of the external device within a shared local network, detection of a set signal strength associated with the external device, and other such detection conditions. In some implementations, the detection of the external device for sharing or transfer of the output of content is accomplished without user intervention. In some implementations, content is shared or transferred for output by the detected external device without user intervention. In some implementations, content is shared or transferred for output by the detected external device in response to a user input indicating verification or confirmation. In some implementations, the detection of the external device and/or the transfer of content from the user device to the external device for execution by the external device may be carried out with limited user intervention to enhance the user experience in consuming content within a system of connected devices.

In some situations, the user experience may be improved by sharing or transferring the execution of content to a detected external device, for output by the detected external device. For example, a user viewing content, for example video content on a handheld device such as a smartphone may prefer to view the content on an alternative output device, such as, for example, a television display screen, a computer display screen and the like having a larger image output capability when the larger image output device is available. Similarly, a user listening to music through, for example, ear buds, an audio output device of a head mounted wearable and the like, may prefer to listen to the music through an alternative output device such as a smart speaker, a sound system and the like when the alternative audio output device is available. The user experience may be further improved if the identification and transfer of content for output by the alternative output device can be facilitated by the detected previous connection of devices, detection of devices within a shared network or a system of previously connected devices, image recognition based on previously stored anchoring information associated with the alternative output devices and the like, which may reduce the amount of user interaction and input required to complete the transfer for execution of the content by the alternative output device. Hence, the term output capabilities can be used to refer to a quality with which the external device can perform a task or a set of tasks, and/or can be used to refer to the output of image (still and/or moving images) and/or audio output that distinguish and/or uniquely define the external devices. The term output characteristics of the content can be used to refer to a certain type of output data (for example, image data and/or audio data) and/or amount of data associated with the output.

FIG. 1 illustrates a user in connection with an example system 100, in accordance with implementations described herein. In the example shown in FIG. 1, the user is wearing a wearable device 110 in the form of an example head mounted display (HMD) device 110, or smart glasses, a wearable device 130 in the form of an example wrist worn device 130, or a smart watch 130, and a wearable device 140, in the form of an example ear worn device 140, or earbuds 140, simply for purposes of discussion and illustration. In the example shown in FIG. 1, the user is holding a handheld device 120 such as, for example, a smartphone 120, simply for purposes of discussion and illustration.

The example system 100 may include one or more computing and/or electronic devices that can communicate with each other, for example, over a network 195 and/or over alternative network(s) and/directly with each other. Example client devices, or user devices, may include, for example, the example devices 110, 120, 130, 140 worn and/or operated by the user, as well as other electronic devices including, for example, a display screen 150/television monitor 150, an audio output device 155/smart speaker 155, a laptop or notebook computing device 160, a tablet computing device 170, a desktop computing device 180, and other such devices. One or more external resources 190 may be accessible to the devices via the network 195. The external resources 190 may include, for example, a server providing access to one or more databases and the like.

Figures 2A, 2B:
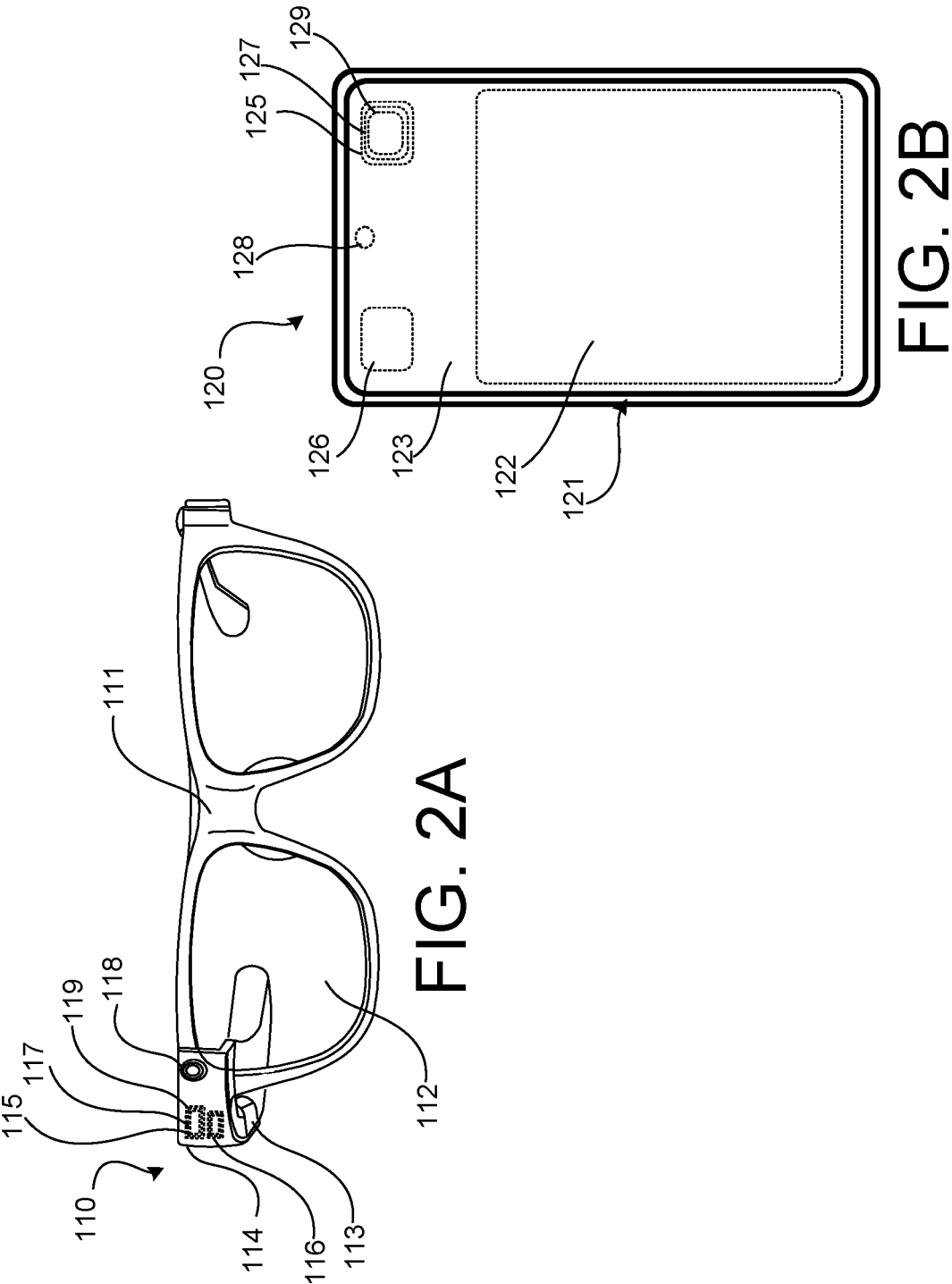
FIGS. 2A-2E are front views of example user electronic devices in the example system shown in FIG. 1.
Figures 2C, 2D, 2E:
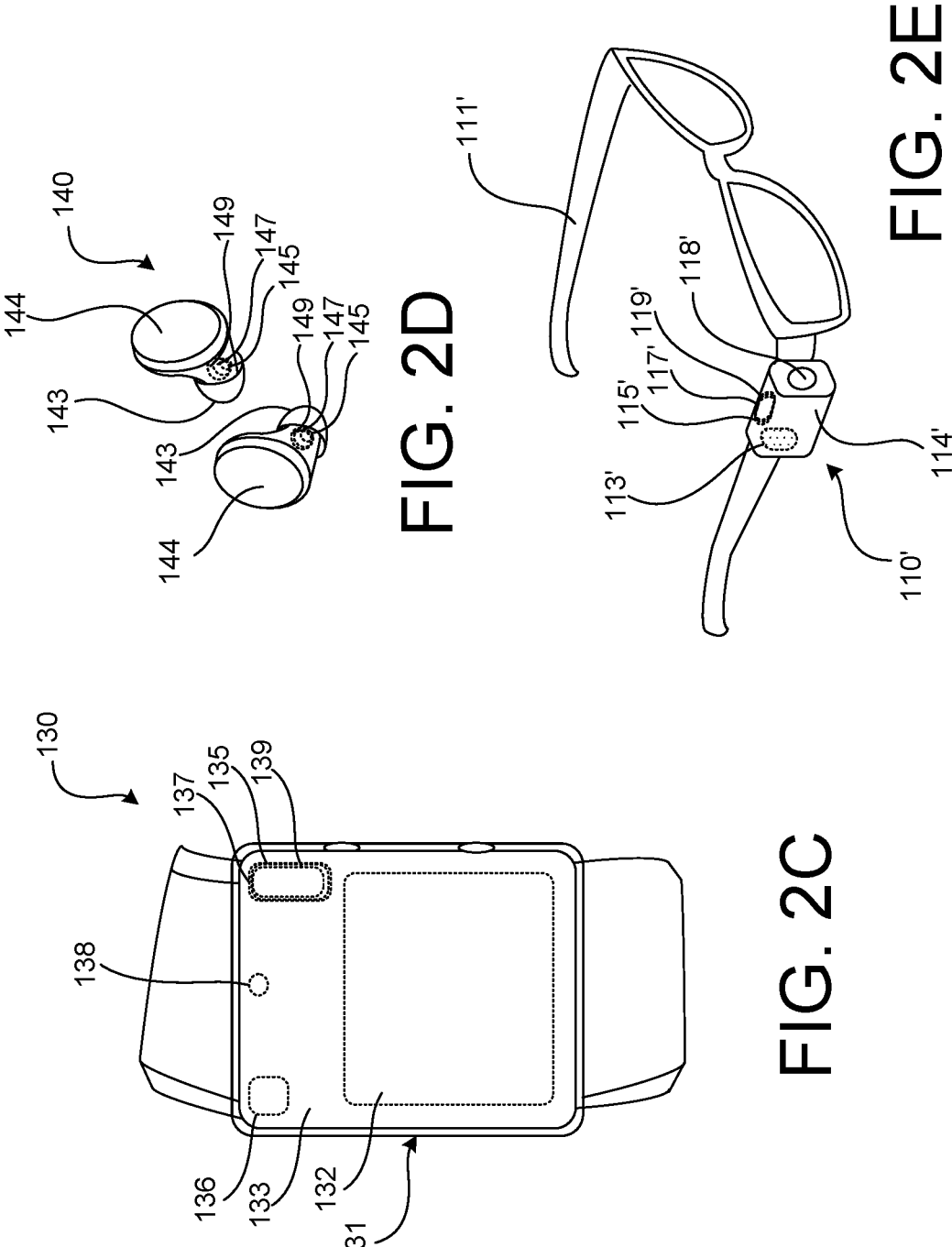

FIG. 2A is a front view of the example wearable device 110, or HMD 110, worn by the user in FIG. 1. FIG. 2B is a front view of the example handheld device 120, or smartphone 120, held by the user in FIG. 1. FIG. 2C is a front view of the example wearable device 130, or smart watch 130, worn by the user in FIG. 1. FIG. 2D is a perspective view of the example wearable device 140, or earbuds 140, worn by the user in FIG. 1. FIG. 2E is a perspective view of another example head mounted wearable device 110'.

The wearable device 110, in the form of the HMD 110, or smart glasses in the example shown in FIG. 2A, may include a frame 111, with a display device 112 coupled in the frame 111. In some implementations, an audio output device 113 is coupled to the frame 111. In some implementations, a touch surface 114 allows for user control, input and the like of the HMD 110. The HMD 110 may include a sensing system 116 including various sensing system devices and a control system 117 including various control system devices to facilitate operation of the HMD 110. The control system 117 may include a processor 119 operably coupled to the components of the control system 117 and a communication module 115 providing for communication with external devices and/or networks. The HMD 110 may also include an image sensor 118 (i.e., a camera), a depth sensor, a light sensor, and other such sensing devices. In some implementations, the image sensor 118, or camera is capable of capturing still and/or moving images, patterns, features, light and the like.

Similarly, the wearable device 110' illustrated in FIG. 2E is shown attached to a pair of glasses to be worn by the user, for use as a head mounted wearable device 110'. However, the wearable device 110' may be attached to, for example, ear buds, lanyards, bracelets, and other such devices that can be worn by the user. In some implementations, the wearable device 110' includes a frame 111', an audio input and/or output device 113' (i.e., a microphone and/or a speaker) and an image sensor 118' (i.e., a camera), a depth sensor, a light sensor, and other such sensing devices). In some implementations, a touch input surface 114' allows for user control, input and the like of the wearable device 110'. The wearable device 110' may include a control system 117' and a processor 119' to facilitate operation of the wearable device 110', and a communication module 115' providing for communication with external devices and/or networks.

The wearable device 130, in the form of the smart watch 130 in the example shown in FIG. 2B, may include an interface device 131. In some implementations, the interface device 131 functions as an output device, including, for example, a display area 132 that can output information to the user. In some implementations, the interface device 131 functions as an input device, including, for example, a touch surface 133, allowing the interface device 131 to receive touch inputs from the user. In some implementations, the interface device 131 can function as an input device and an output device. The wearable device 130 may include a sensing system 136 including various sensing system devices. The wearable device 130 may include a control system 137 including various control system devices, a communication module 135 providing for communication with external devices and/or a network, and a processor 139, to facilitate operation of the device 130. The wearable device 130 may also include an image sensor 138 (i.e., a camera 138), a depth sensor, a light sensor, and other such sensing devices. In some implementations, the image sensor 138, or camera 138 is capable of capturing still and/or moving images, patterns, features, light and the like.

The handheld device 120, in the form of the smartphone 120 in the example shown in FIG. 2B, may include an interface device 121. In some implementations, the interface device 121 functions as an output device, including, for example, a display area 122 that can output information to the user. In some implementations, the interface device 121 functions as an input device, including, for example, a touch surface 123, allowing the interface device 121 to receive touch inputs from the user. In some implementations, the interface device 121 functions as an input device and an output device. The handheld device 120 may include a sensing system 126 including various sensing system devices. The handheld device 120 may include a control system 127 including various control system devices, a communication module 125 providing for communication with external devices and/or a network, and a processor 129, to facilitate operation of the handheld device 120. The handheld device 120 may also include an image sensor 128

(i.e., a camera 128), a depth sensor, a light sensor, and other such sensing devices. In some implementations, the image sensor 128, or camera 128 is capable of capturing still and/or moving images, patterns, features, light and the like.

The wearable device 140, in the form of the earbuds 140, is shown in FIG. 2D. The wearable device 140 may include an audio device 143. In some implementations, the audio device 143 functions as an audio output device (i.e., a speaker) and an audio input device (i.e., a microphone). In some implementations, a touch input surface 144 allows for user control, input and the like of the wearable device 140. The wearable device 140 may include a control system 147 and a processor 149 to facilitate operation of the wearable device 140, and a communication module 145 providing for communication with external devices and/or networks.

Figure 3:
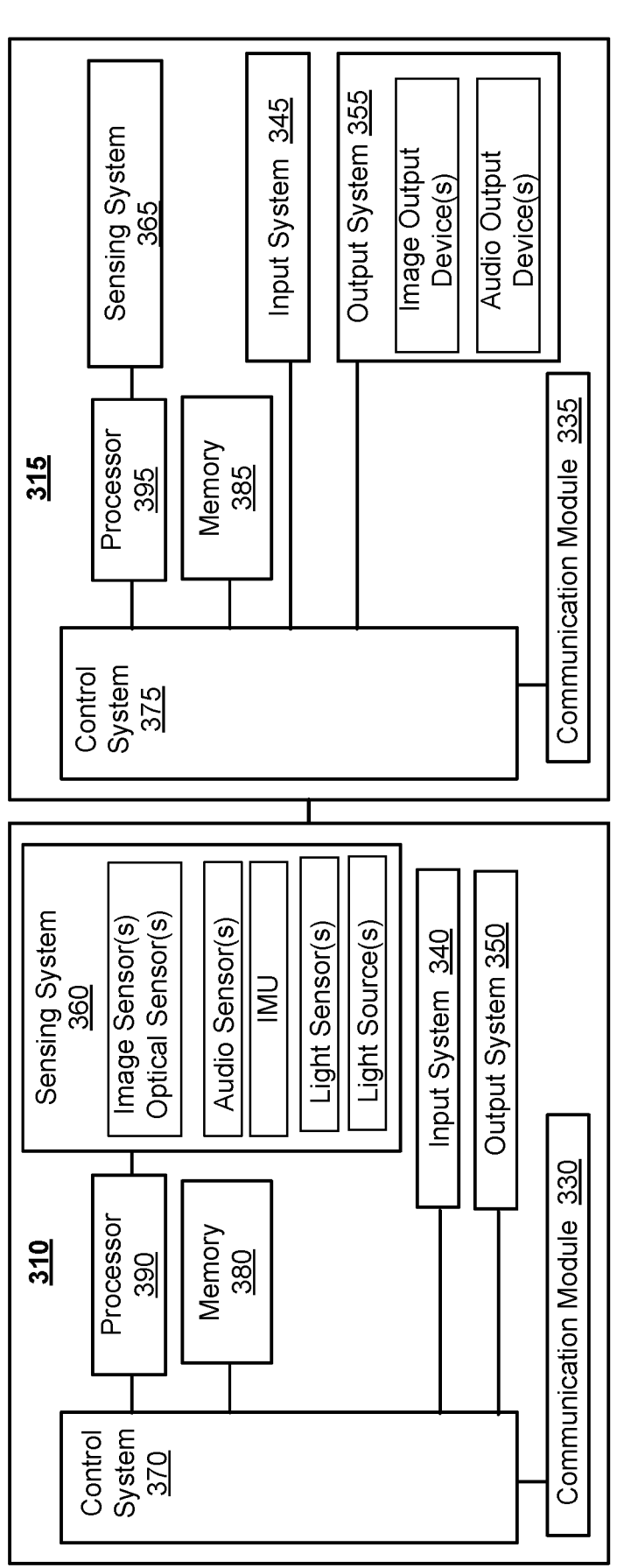
FIG. 3 is a block diagram of an example system configured to implement the concepts described herein.

FIG. 3 is a block diagram of an example system 300 that can implement the concepts described herein. The block diagram shown in FIG. 3 illustrates a first electronic device 310, such as, for example, one of the example user devices 110, 120, 130, 140 shown in FIG. 1, in communication with a second electronic device 315 such as, for example, one of the example external devices 150, 160, 170, 180, 190 shown in FIG. 1.

The first electronic device 310 may include a sensing system 360 and a control system 370. The sensing system 360 may include one or more different types of sensors, including, for example, a light sensor, an audio sensor, an image sensor, a distance/proximity sensor, and/or other sensors and/or different combination(s) of sensors. In some implementations, the sensing system 360 includes an image sensor and/or an optical sensor. The control system 370 may include, for example, power/pause control device(s), audio and video control device(s), optical control device(s), and/or other such devices and/or different combination(s) of devices. The sensing system 360 and/or the control system 370 may include more, or fewer, devices, depending on a particular implementation. The electronic device 310 may include a processor 390 in communication with the sensing system 360 and the control system 370. The processor 390 may process inputs received from the sensing system 360, such as, for example, images and/or optical scans, captured by the image sensor/optical sensor. The first electronic device 310 may include an input system 340 that can receive user inputs to be processed by the processor 390 and output by an output system 350 under the control of the control system 370. The input system 340 may include various types of input devices including, for example, a touch input surface, audio input devices that can receive audio inputs (including, for example, audio sensors, or microphones, included in the sensing system 360), a gesture recognition device (including, for example, images captured by image sensors(s) of the sensing system 360 and processed by the processor 390), and other such input devices. The output system 350 may include various types of output devices such as, for example, display device(s), audio output device(s), or speakers, physical and/or tactile output devices, and other such output devices. The first electronic device 310 may include a memory 380, and a communication module 330 providing for communication between the first electronic device 310 and one or more other, external device(s), networks, servers and the like, including, for example, the second electronic device 315.

The second electronic device 315 may include a sensing system 365 including one or more different types of sensors, and a control system 375 control modules for controlling operation of the second electronic device 315. A number and/or combination of the components of the sensing system 365 and/or the control system 375 may vary, depending on a particular implementation. The second electronic device 315 may include a processor 395 in communication with the sensing system 365 and the control system 375, allowing the processor 395 to process inputs received from the sensing system 360. The second electronic device 315 may include an input system 345 that can receive inputs to be processed by the processor 395 and output by an output system 355 under the control of the control system 375. The output system 355 may include various types of output devices such as, for example, display device(s), audio output device(s), or speakers, physical and/or tactile output devices, and other such output devices. In some implementations, the second electronic device 315 includes a memory 385, and a communication module 335 providing for communication between the second electronic device 315 and one or more other, external device(s), networks, servers and the like, including, for example, the first electronic device 310.

FIGS. 4A-4F illustrate the detection and/or identification of external devices and the transfer of the execution of content, or casting of content, from a user device to the identified external device, in accordance with implementations described herein. In the example to be described with respect to FIGS. 4A-4F, the user device refers to the device, or devices, in use by the user for accessing content, and for transferring execution of content, or casting content to the external device, and the external device refers to the device, or devices, in the physical space that are configured to receive and output content from the user device(s). In the example to be described with respect to FIGS. 4A-4F, the handheld device 120 and the wearable device 110 (in the form of smart glasses) will be used as example user devices, and the television 420 will be used as an example external device that receives content from the user device, simply for purposes of discussion and illustration. The principles to be described may be applied to other devices and/or combinations of devices functioning as user devices, and other devices and/or combinations of devices functioning as external devices.

Figure 4A:
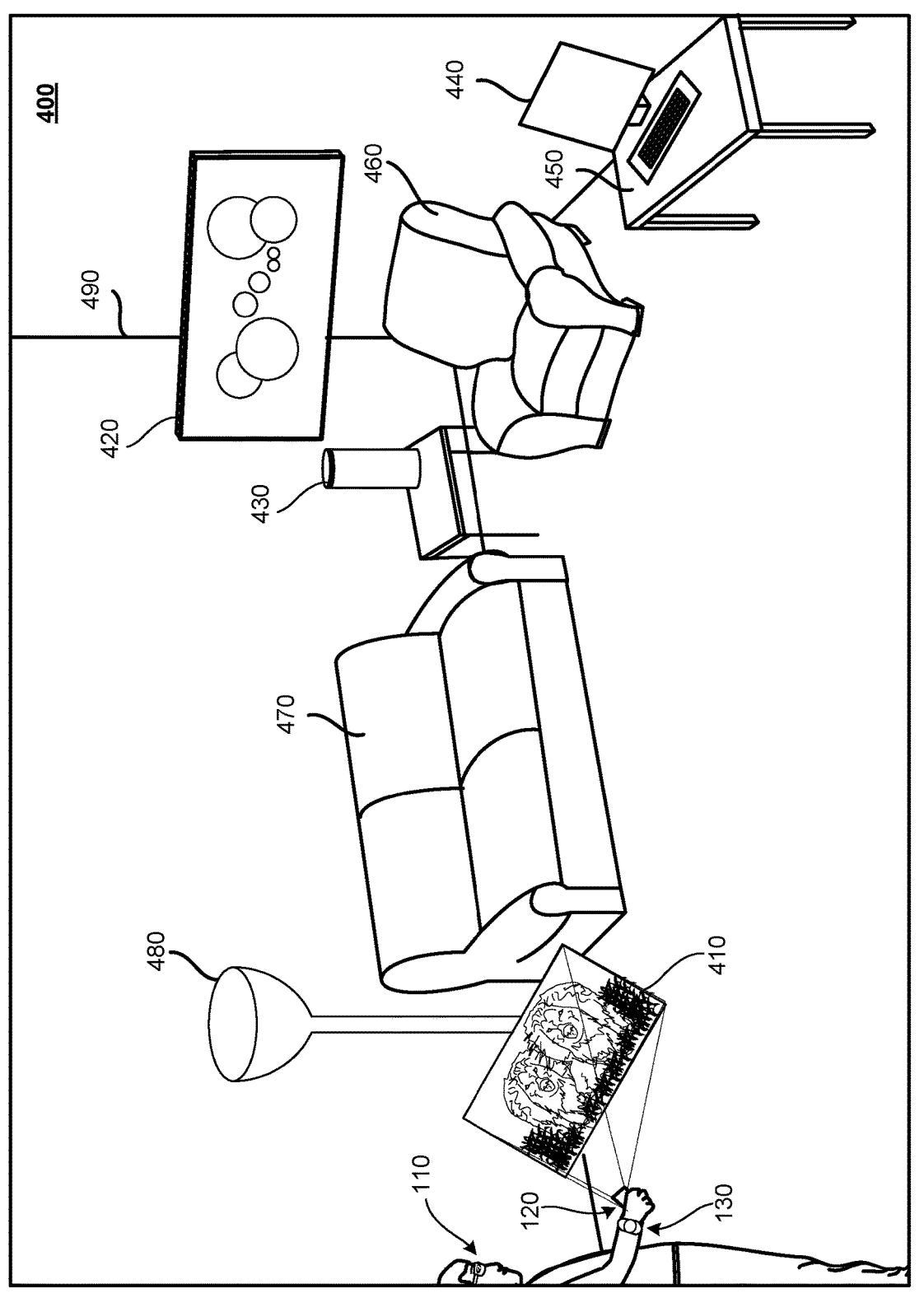
FIGS. 4A-4F illustrate detection of external devices and transfer of execution of content from a user device to the identified external device, in accordance with implementations described herein.

FIG. 4A is a third person view of a user approaching an example physical space 400. In the example illustrated in FIG. 4A, the user is wearing the example wearable device 110 (i.e., the HMD 110, in the form of smart glasses) and the example wearable device 130 (i.e., the smart watch 130). In the example shown in FIG. 4A, the user is accessing content 410 using the handheld device 120. In the example scenario illustrated in FIG. 4A, the content 410 would be output in the display area 122 of the handheld device 120; however, in FIG. 4A the content 410 is illustrated in a pane outside of the handheld device 120, simply for case of discussion and illustration. In this example, the content 410 is image content, or video content. The principles to be described herein may be applied to other types of content and/or to other types of user devices that provide the user with access to content.

Figure 4B:
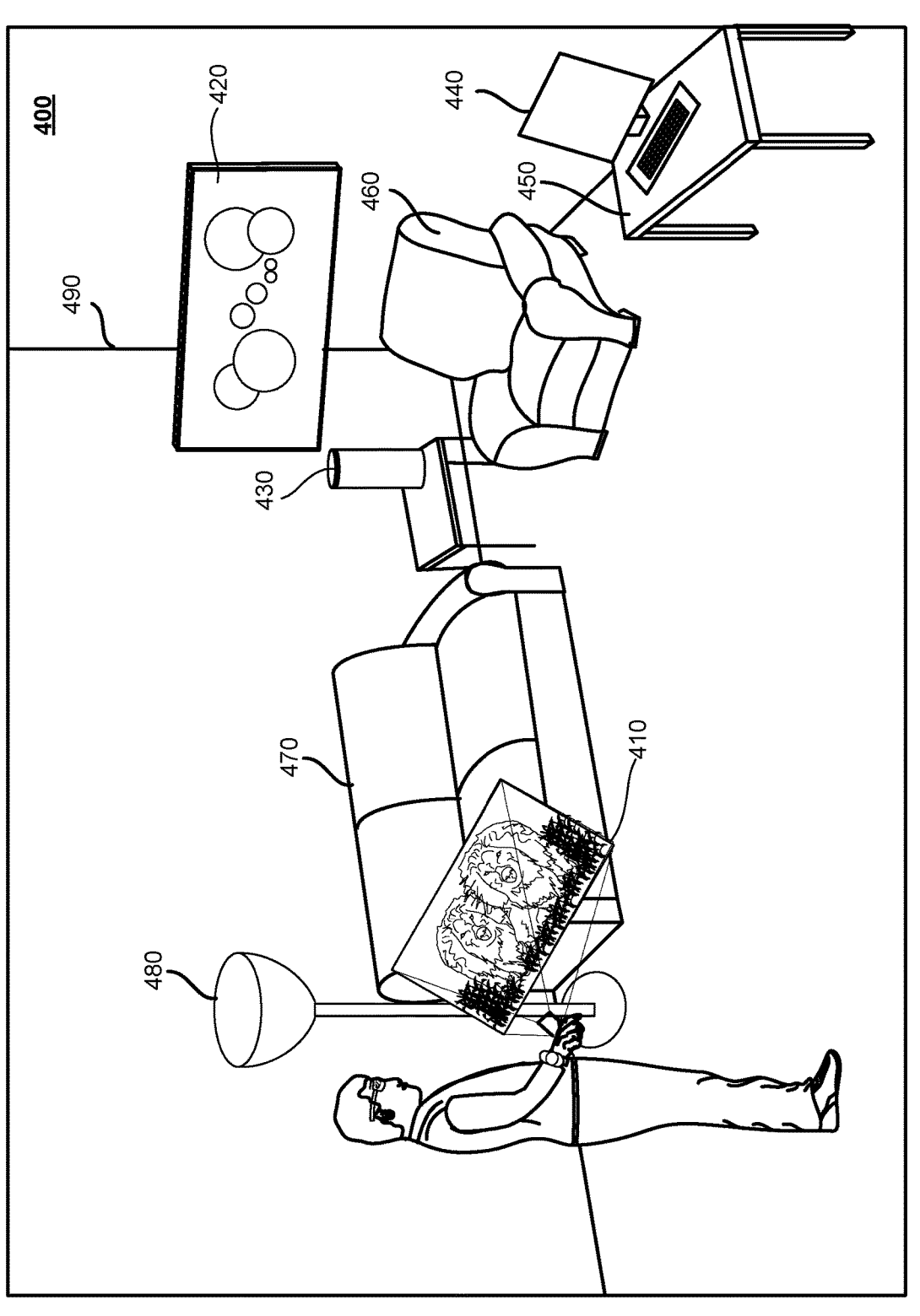

As the user moves further into the physical space 400, as shown in FIG. 4B, external devices within the physical space 400 may be detected. For example, external devices that are capable of communication with the user device(s) in use by the user (for example, the handheld device 120 and/or the wearable device(s) 110, 130) may be detected. Detection and/or identification of the external device(s) may provide for the exchange of information between the user device(s) and the detected external device(s), allowing the user to transfer, or share, or cast content to the detected external device(s) for output by the external devices, to provide an improved user experience.

In some implementations, the external device(s) are detected based on a previously established connection or pairing between the user device and the detected external device(s). In some implementations, the external device(s) are detected based on a detected signal, for example, a short range signal such as wifi signal or a bluetooth signal, emitted by the external device(s), electromagnetic signals, and the like. In some implementations, the external device(s) are detected based on a detected signal strength. In some implementations, the external device(s) are detected in response to a determination that the user device(s) and the external device(s) are in the same local network. In some implementations, the user device(s) (for example the handheld device 120 and/or the wearable device 110) and the external device(s) include ultra-wideband (UWB) chips that provide for detection of and communication between the user device(s) and the external device(s) for exchange of information. In some implementations, external devices, features and/or elements in the physical space may be detected in image information captured by the user device(s). Image information captured by the user device(s) may be compared to previously stored anchoring information to identify features defining the physical space 400. This may be used to identify the physical space 400, and to identify known external device(s) in the identified physical space 400, and/or to detect, locate and identify the external device(s) in the physical space 400.

Returning to FIG. 4B, the example physical space 400 includes a television 420 mounted at an intersection of two physical boundaries, or walls, of the physical space 400 defining a corner 490. A display of a computing device 440 is positioned on a desk 450 at a first side of a chair 460. A lamp 480 is positioned at a first side of a couch 470. An audio output device 430, or smart speaker 430, is positioned on a table, between respective second sides of the chair 460 and the couch 470. The features and devices in the example physical space 400 illustrated in FIGS. 4A and 4B are provided simply for purposes of discussion and illustration. The principles described herein can be carried out in situations in which more or fewer features, elements, devices and the like are available and/or arranged differently.

As noted above, as the user moves into the physical space 400, various external devices such as, for example, the television 420 and the smart speaker 430, may be detected by the user device (the handheld device 120 and/or the HMD 110 in this example). For example, the external devices (in the form of the television 420 and the smart speaker 430 in this example) may be detected based on a previous connection or pairing with the user device(s) (in the form of the handheld device 120 and the HMD 110 in this example), detection of the user device(s) and the external device(s) in the same local network (for example, a home network or local area network), signals emitted by the external device(s) and detected by the user device(s), and the like. In some implementations, the detected external device(s) are identified with associated functionality. For example, the television 420 may be identified as capable of outputting image content (still and/or moving image content, together with audio content). The smart speaker 430 may be identified as capable of outputting audio content. A connection may be established between the user device(s) and one (or more) of the identified external device(s) to facilitate the transfer of content from the user device(s) to the identified external device(s) for execution by the identified external device(s).

Figure 4C:
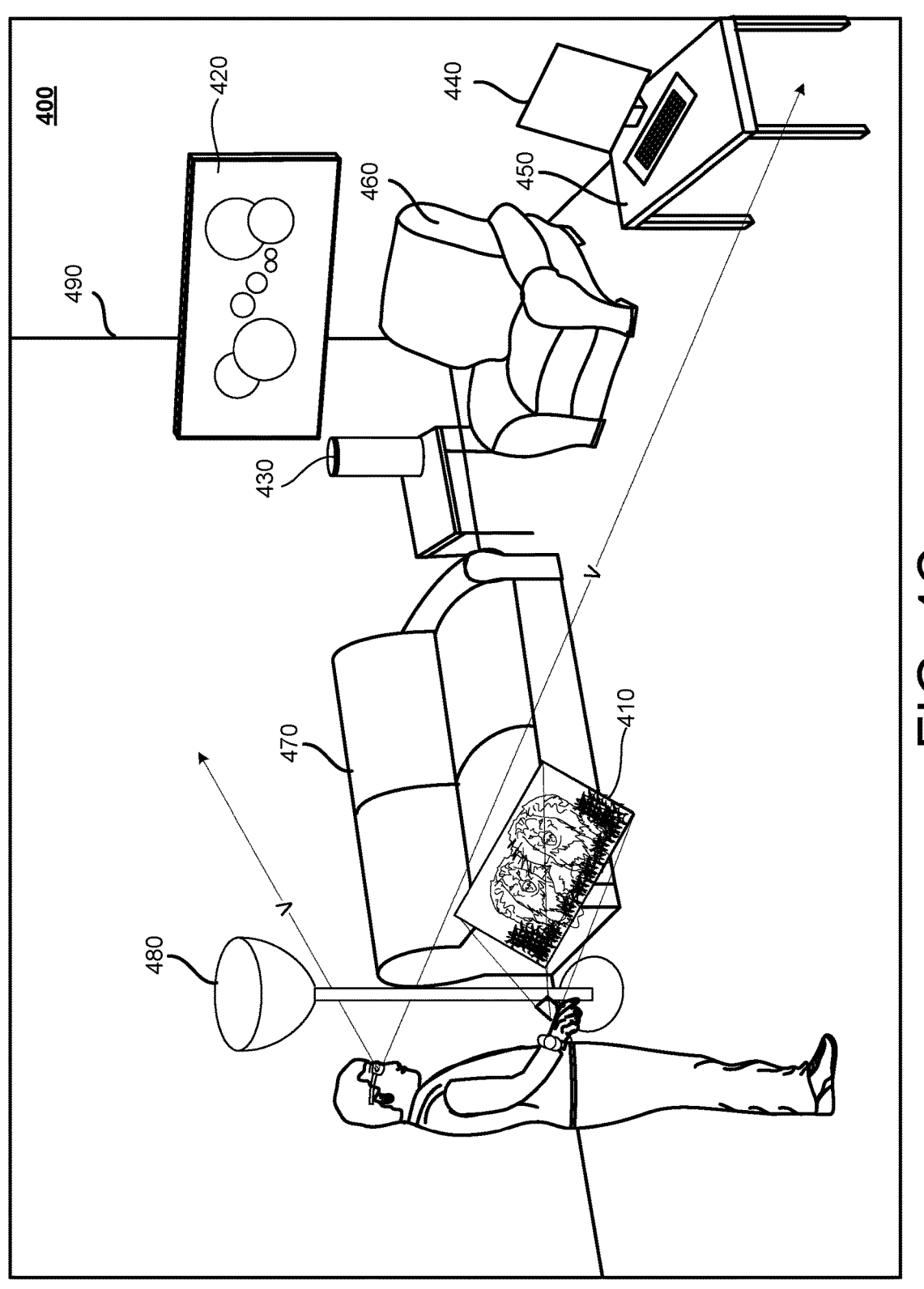

In some situations, as the user enters the physical space 400, various features, elements, devices and the like are captured within the field of view V of the user device, in the form of the HMD 110 in the example shown in FIG. 4C. In some implementations, image information captured by the user device is used to detect and identify external devices in the physical space 400. For example, the image information captured by the user device may be used to identify external devices in the physical space that are compatible for the transfer, or sharing, or casting of content from the user device and/or that are capable of outputting content transferred to the external device from the user device.

Figure 4D:
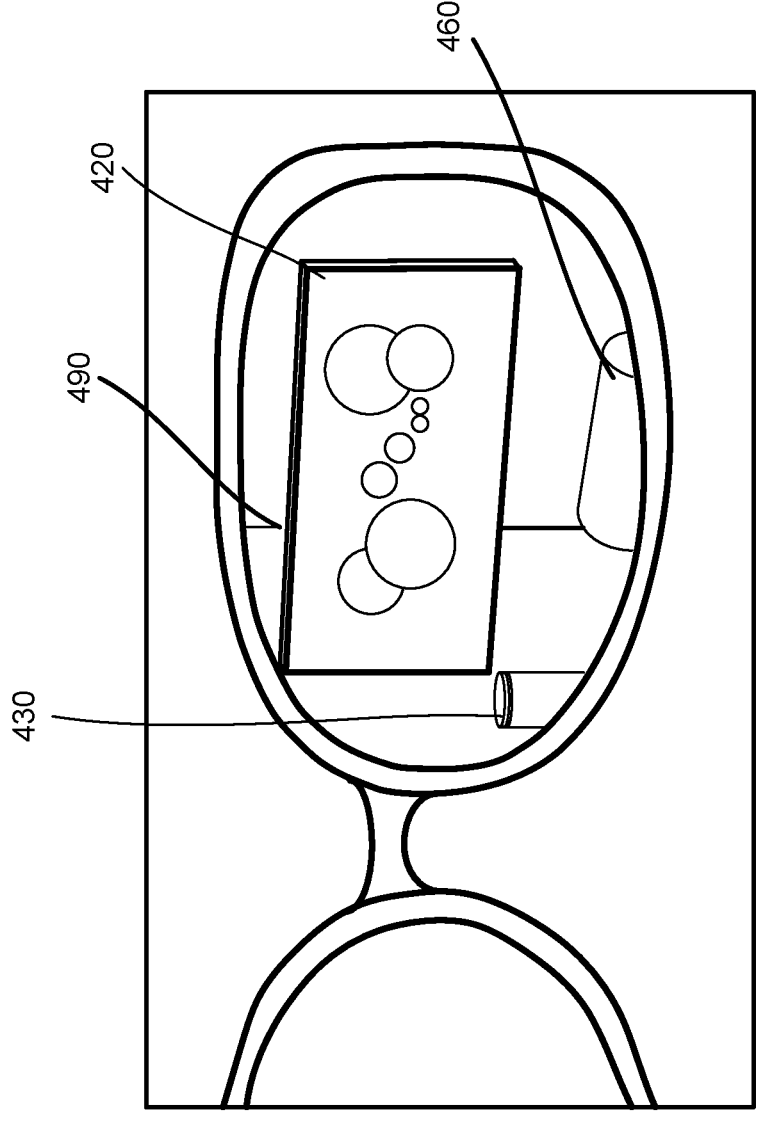

The example physical space 400 includes numerous examples of substantially consistent features which may be detected in images captured by an image sensor of the user device, and which may be used to identify the physical space 400, and to identify external devices in the physical space 400. For example, the television 420 may be identified based on the known placement of the television 420 in the living room (the physical space 400 in this example) of the user, established during, for example, a setup and configuration process for devices in the home of the user. In some implementations, the television 420 may be identified based on detection of the corner 490 of the physical space 400, and the positioning above the chair 460 and the smart speaker 430. These physical features associated with the area surrounding the television 420 may substantially consistent physical features defining anchoring information associated with the television 420 in the physical space, and which may facilitate the later identification of the television 420 in the physical space 400 in this manner. FIG. 4D illustrates a view of the television 420, through the HMD 110, including these substantially consistent features. Similarly, the smart speaker 430 may be identified based on the known placement of the smart speaker 430 between the couch 470 and the chair 460, and proximate the corner 490. This type of anchoring information may be collected and stored, for example, in a database that is accessible via a server through a network as described above. The user may access the stored anchoring information for identification of the physical space 400, and for identification of external devices in the physical space 400. The user may transfer, or share, or cast content to an external device detected and identified in this manner, for execution by the external device.

In the example shown in FIGS. 4A-4F, the user is consuming content, for example, video content output by the handheld device 120. As the user enters the physical space 400, one or more external devices in the physical space 400 that are compatible for receiving the content 410 from the handheld device 120 and outputting the content 410 may be detected and identified in the manner described above with respect to FIG. 4B and/or FIG. 4C. That is, one or more external device(s) that are equipped to output the content 410 may be detected. In response to the detection and identification of external devices in the physical space 400, the system may determine that the television 420 (the external device in this example) may provide for improved viewing of the content 410 currently output by the handheld device 120 (the user device in this example). The system may make this determination based on, for example, previous connection and pairing, previous configuration of the devices within the network, anchoring information including previously stored input/output capabilities or characteristics of the television 420 (compared to output characteristics of the content 410), previously stored processing capabilities or characteristics of the television 420 and the like.

Figure 4E:
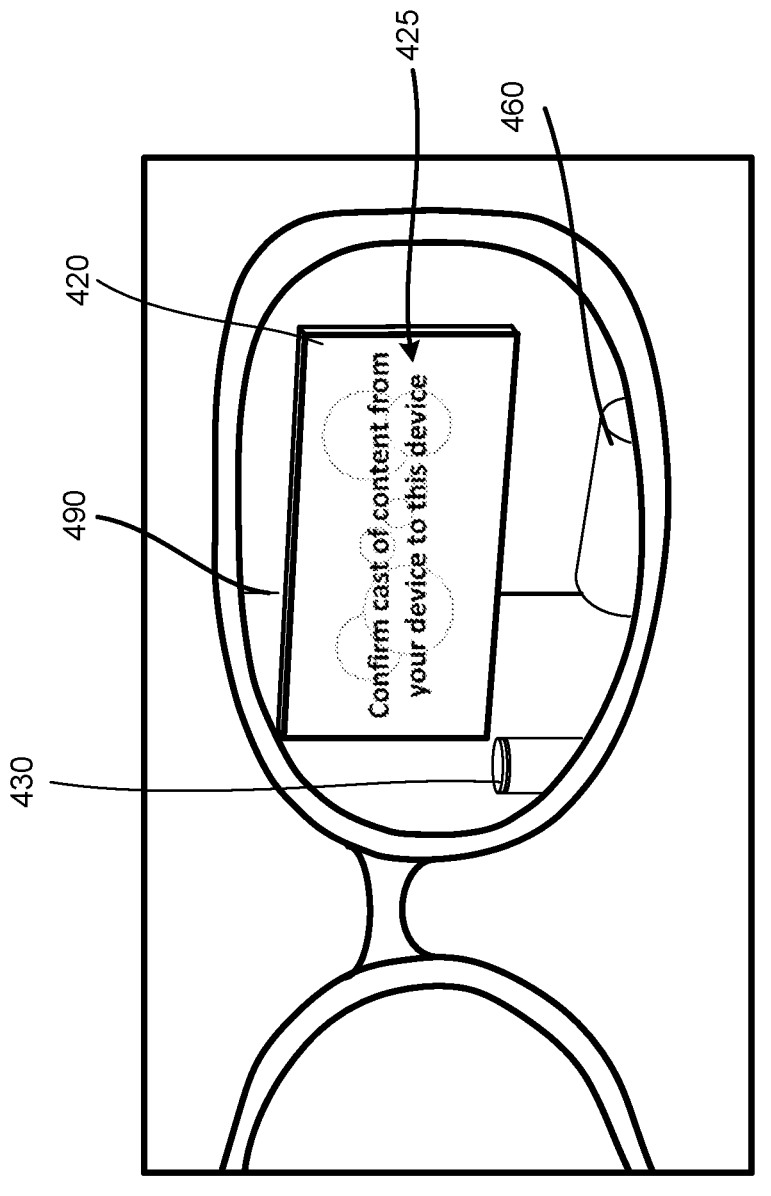
Figure 4F:
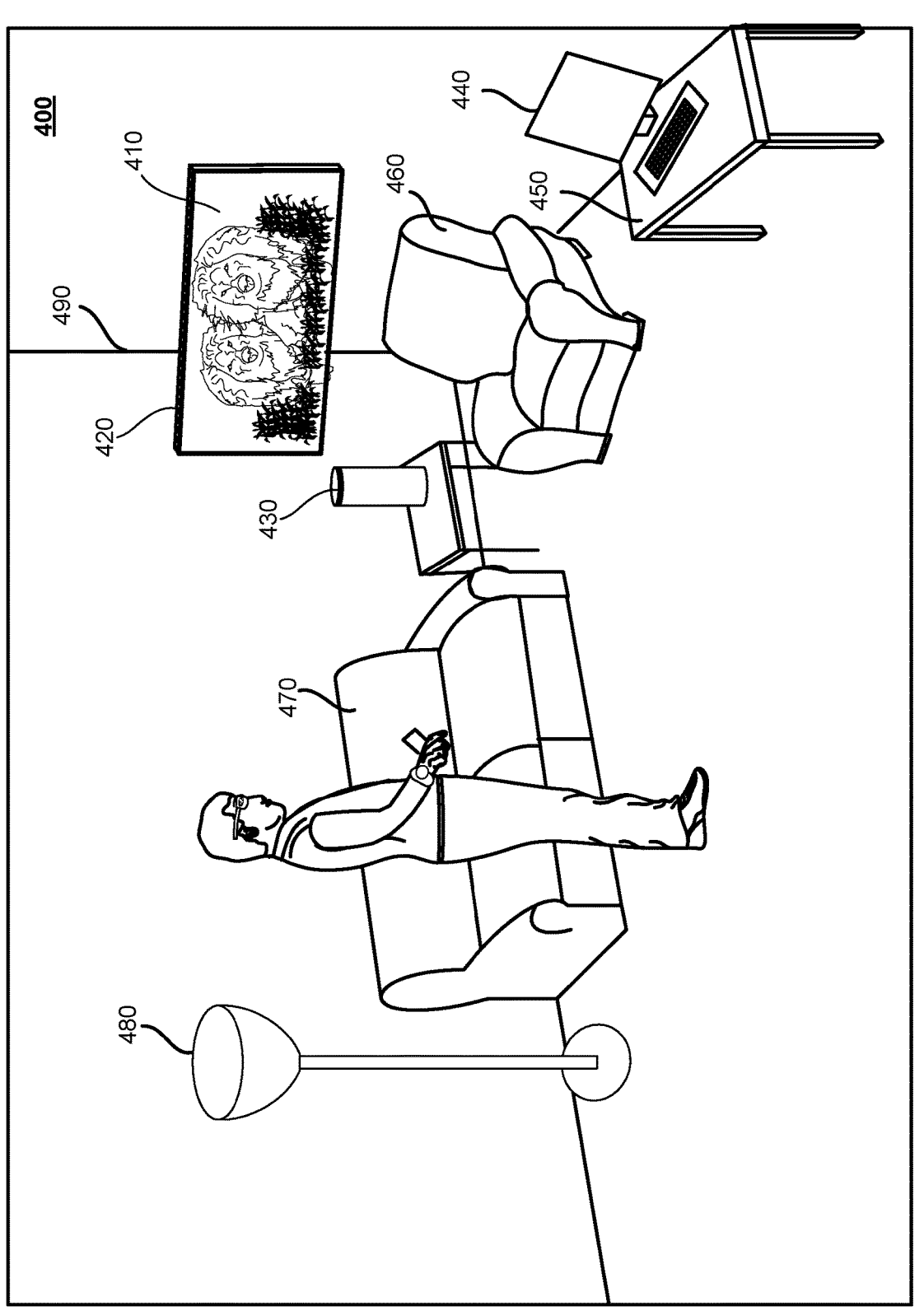

In this example, the content 410 output by the handheld device 120 may be video content 410 including image content and audio content. Thus, the television 420 may be identified as the external device in the physical space 400 to which the video content 410 from the handheld device 120 is likely to be transferred, or shared, or cast for output based on characteristics associated with the content 410. In some implementations, the system may generate a query, or prompt, or request for verification 425, as shown in FIG. 4E. The request for verification 425 may request user confirm that the content 410 should be transferred to, or shared with, or cast to the television 420 prior to casting, to avoid unintentional or inadvertent casting of content to an external device. In the example shown in FIG. 4E, the request for verification 425 is a visual output by the television 420, for purposes of discussion and illustration. In some implementations, the request for verification 425 is output in a different form. For example, the request for verification 425 can be an audio output, an audio output combined with a video output, a physical output, and the like. In response to the request for verification 425, the user may enter a verification input. The verification input may include, for example, an input at the HMD 110, an input at the handheld device 120, and the like. For example, the verification input may include a touch or tap input on the touch surface 114 of the HMD 110, the touch surface of the handheld device 120, or other such user input. The verification input may include an audible, or voice input, that is detected by an audio input device, or microphone, f the external device. In response to the user verification input, the content 410 being output by the handheld device 120 may be output by the television 420, as shown in FIG. 4F.

In some implementations, content from the user device (the handheld device 120 in this example) may be transferred for execution, or cast to, the external device (the television 420 in this example) without user intervention. That is, in some implementations, content from the user device (the handheld device 120 in this example) may be transferred to, or shared with, or cast to, the external device (the television 420 in this example) for execution by the external device without the request for verification 425 and the user verification input described above with respect to FIG. 4E.

Figure 5:
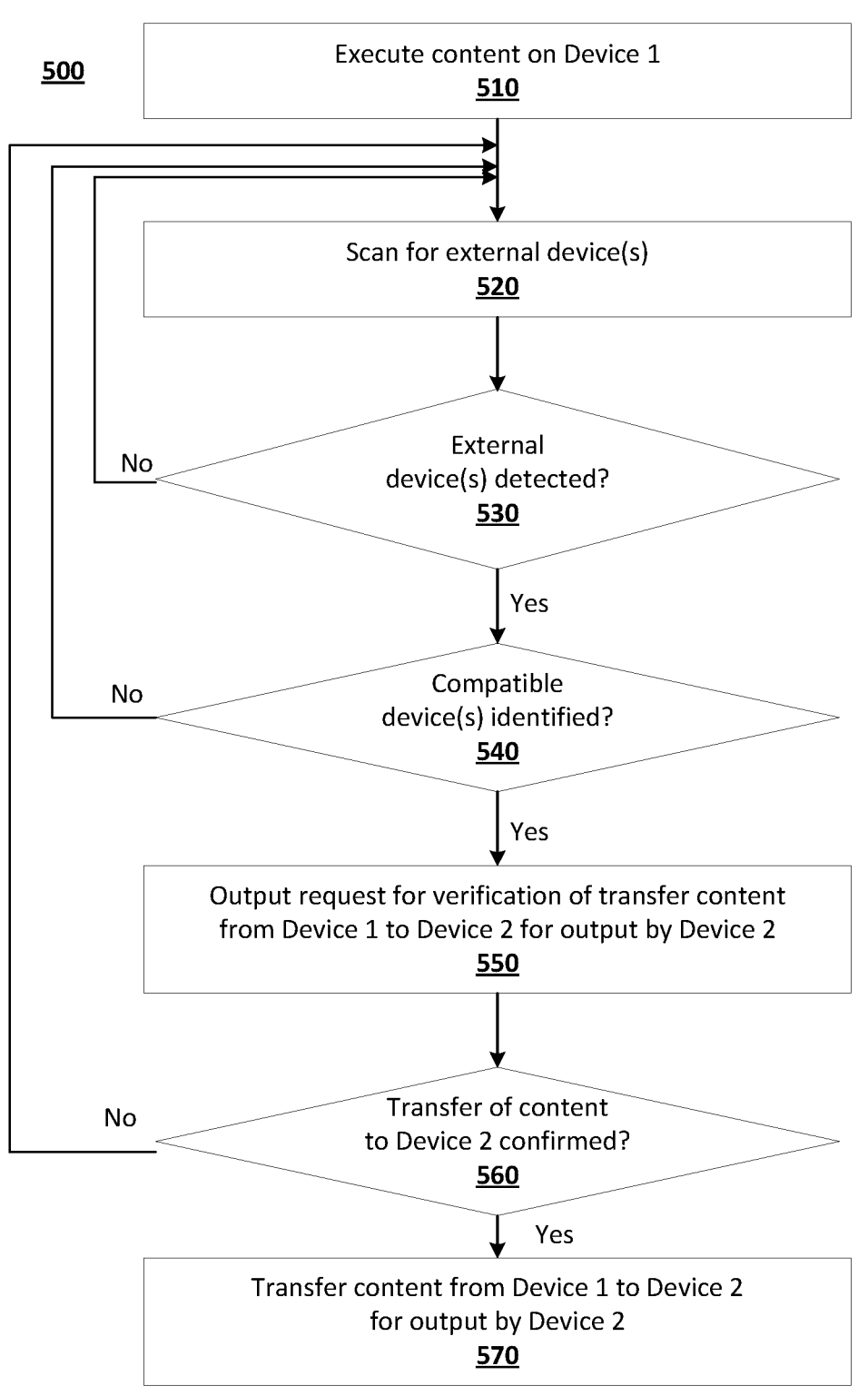
FIG. 5 is a flowchart of an example method, in accordance with implementations described herein.

FIG. 5 is a flowchart of an example method 500 for detecting external device(s), and for transferring the execution and output of content to detected external device(s), in accordance with implementations described herein. Content may be executed and output by a first device (block 510), such as, for example, the content 410 output by the user device in the form of the handheld device 120 described above with respect to FIGS. 4A-4F. One or more external device(s) may be detected (block 520, 530). The detected external device(s) may be capable of communication with the first device, for example through a network, or other type of connection. In some implementations, the external device(s) are detected based on previous connection to or pairing with the first device, a shared network with the first device, a shared signal and/or signal strength, image information extracted from images captured by the first device and/or by another user device and matched with previously stored anchoring information, and the like. The system may determine that one or more of the detected external device(s) is configured for output of the content currently being output by the first device (block 540), and may select one of the detected external devices for output of the content.

For example, as described above with respect to FIGS. 4A-4F, the system may determine which of the detected external devices detected in the physical space 400 are capable of outputting the content 410 currently being output by the handheld device 120. In the example described above, the content 410 being output by the handheld device 120 includes at least image content, and may also include audio content. Thus, the system may determine that the television 420 is the most properly configured (of the external devices detected in the physical space 400) for the output of the video content 410. For example, the audio output device 430, or smart speaker 430 may have limited, or no image output capability. Similarly, the computing device 440 may have limited, or no audio output capability. Thus, the system may select the television 420 as a second device, for output of the content 410.

In some implementations, the system outputs a request for verification, prior to transferring the execution of content from the first device to the second device (block 550) to, for example, avoid unintentional transfer, or sharing, or casting of content to an external device. In response to a user input verifying the transfer of content from the first device to the second device (block 560), the content may be transferred to the second device, for output by the second device (block 570).

A system and method, in accordance with implementations described herein, provides for the sharing and transfer of execution of content output by a user device, from the user device to an external device, for execution and output by the external device. Execution of content may be transferred or shared for output by the external device in response to the detection of the external device within a set proximity, or a set range, of the user device, detection of the external device within a field of view of the user device, detection of the external device based on image data collected by the user device, detection of the external device within a shared local network, detection of a set signal strength associated with the external device, electromagnetic signals, and other such detection conditions. The detection of the external device and/or the transfer of content from the user device to the external device for execution by the external device may be carried out with limited user intervention to enhance the user experience in consuming content within a system of connected devices.

Figure 6:
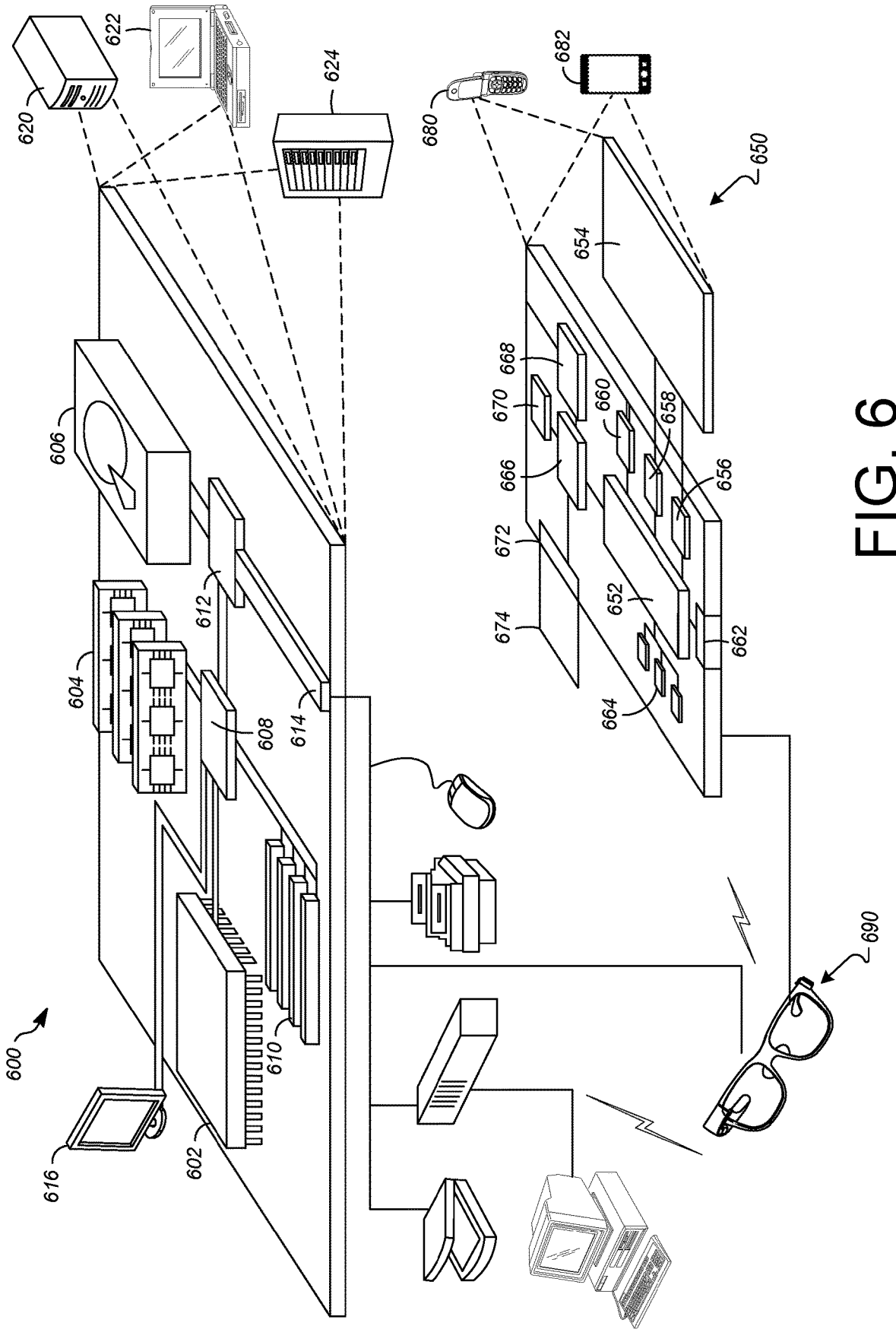
FIG. 6 shows an example of a generic computer device and a generic mobile computer device.

FIG. 6 shows an example of a generic computer device 600 and generic mobile computer devices 650, 690, which may be used with the techniques described herein. Computing device 600 is intended to represent various forms of digital computers, such as laptops, desktops, tablets, workstations, personal digital assistants, televisions, servers, blade servers, mainframes, and other appropriate computing devices. For example, computing device 600 may be and/or be used as the server referenced above. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. The processor 602 can be a semiconductor-based processor. The memory 604 can be a semiconductor-based memory. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 666, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA600, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described herein), or any combination of such back end, middleware, or front end components.

The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

The invention claimed is:

1. A computer-implemented method, comprising:
detecting, by a computing device, at least one external device;
identifying the at least one external device for output of content being output by the computing device based on output capabilities of the at least one external device, the content including at least one of image content or audio content;
receiving an input verifying a transfer of the output of the content from the computing device to the at least one external device; and
transferring the output of the content from the computing device to the at least one external device for output of the content by the at least one external device in response to receiving the input verifying the transfer.

2. The computer-implemented method of claim 1, wherein identifying the at least one external device includes:
detecting physical features in image data captured by an image sensor of the computing device;
identifying a location of the computing device based on the physical features detected in the image data; and
identifying the at least one external device based on the location of the computing device identified based on the physical features detected in the image data.

3. The computer-implemented method of claim 2, wherein the computing device is a head worn display device providing for output of the content, and wherein:
detecting physical features in the image data includes detecting physical features in image data captured by an image sensor of the head worn display device; and
transferring the output of the content includes transferring the output of the content from the head worn display device to the at least one external device in response to receiving the input verifying the transferring of the output of the content.

4. The computer-implemented method of claim 3, wherein the computing device includes a handheld device providing for output of the content and a head worn display device, and wherein:
detecting physical features in the image data includes detecting physical features in image data captured by an image sensor of the head worn display device; and
transferring the output of the content includes transferring the output of the content from the handheld device to the at least one external device in response to receiving the input verifying the transferring of the output of the content.

5. The computer-implemented method of claim 3, wherein identifying the location of the computing device based on the physical features detected in the image data includes identifying the location based on a comparison of physical features previously stored in a database and accessible to the computing device via a server.

6. The computer-implemented method of claim 1, wherein detecting the at least one external device includes at least one of:
detecting the at least one external device within a field of view of an image sensor of the computing device;
detecting the at least one external device as a previously connected device;
detecting the at least one external device based on an electromagnetic signal;
detecting the at least one external device within a shared network; or
detecting the at least one external device within a network of previously connected devices.

7. The computer-implemented method of claim 1, wherein transferring output of the content from the computing device to the at least one external device includes:
outputting a prompt requesting verification prior to transferring the output of the content from the computing device to the at least one external device, including outputting at least one of a visual request or an audible request; and
receiving the input, including receiving at least one of a touch input or an audible input in response to the prompt requesting verification.

8. A system, including:
an output system including an audio output device and an image output device;
an input system including a touch input device and an audio input device;
a sensing system;
at least one processor; and
a memory storing instructions that, when executed by the at least one processor, cause the at least one processor to:
detect, by the sensing system, at least one external device while the output system is outputting content executed by the at least one processor, the content including at least one of image content or audio content;
identify the at least one external device for output of the content based on output capabilities of the at least one external device;
receive an input verifying a transfer of the output of the content from the output system to the at least one external device; and
transfer output of the content being output by the output system to the at least one external device for output of the content by the at least one external device in response to the input verifying the transfer.

9. The system of claim 8, wherein the instructions cause the at least one processor to detect the at least one external device in image data captured by an image sensor the sensing system.

10. The system of claim 9, wherein the instructions cause the at least one processor to:

detect physical features in the image data;

identify a location based on a comparison of the physical features detected in the image data with features previously stored in a database accessible to the system via a server; and identify the at least one external device based on the location identified based on the comparison.

11. The system of claim 8, wherein the instructions cause the at least one processor to detect the at least one external device, including at least one of:

detect the at least one external device within a field of view of an image sensor of the sensing system;

detect the at least one external device as a previously connected device;

detect the at least one external device based on an electromagnetic signal;

detect the at least one external device within a shared network; or detect the at least one external device within a network of previously connected devices.

12. The system of claim 8, wherein the instructions cause the at least one processor to transfer the output of the content to the at least one external device, including:

output a prompt requesting verification prior to transferring the output of the content to the at least one external device, the prompt including a visual prompt or an audible prompt; and receive the input in response to the prompt, verifying the transferring of the output of the content to the at least one external device, the input including a touch input or an audible input.

13. The system of claim 8, wherein the output system, the sensing system, the at least one processor and the memory are installed in a head worn display device that provides for the output of the content.

14. The system of claim 8, wherein the output system, the at least one processor and the memory are installed in a handheld device that provides for the output of the content, and the sensing system is head worn display device.

15. A non-transitory computer-readable medium storing executable instructions that, when executed by at least one processor of a computing device, are configured to cause the at least one processor to:

detect at least one external device;

identify the at least one external device for output of content being output by the computing device based on output capabilities of the at least one external device, the content including at least one of image content or audio content;

receive an input verifying a transfer of the output of the content from the computing device to the at least one external device; and transfer output of the content from the computing device to the at least one external device for output of the content by the at least one external device in response to receiving the input verifying the transfer.

16. The non-transitory computer-readable medium of claim 15, wherein the executable instructions are configured to cause the at least one processor to detect the at least one external device in image data captured within a field of view of an image sensor of the computing device.

17. The non-transitory computer-readable medium of claim 16, wherein the executable instructions cause the at least one processor to identify the at least one external device including:

detect physical features in the image data captured by the image sensor of the computing device;

identify a location of the computing device based on the physical features detected in the image data; and identify the at least one external device based on the location of the computing device identified based on the physical features detected in the image data.

18. The non-transitory computer-readable medium of claim 17, wherein the executable instructions cause the at least one processor to identify the location of the computing device including:

identify the location of the computing device based on a comparison of physical features detected in the image data with features previously stored in a database accessible to the computing device via a server.

19. The non-transitory computer-readable medium of claim 15, wherein the executable instructions are configured to cause the at least one processor to detect the at least one external device including at least one of:

detect the at least one external device within a field of view of an image sensor of the computing device;

detect the at least one external device as a previously connected device;

detect the at least one external device based on an electromagnetic signal;

detect the at least one external device within a shared network; or detect the at least one external device within a network of previously connected devices.

* * * * *